(12) United States Patent
Wideman et al.

(10) Patent No.: US 10,380,066 B2
(45) Date of Patent: Aug. 13, 2019

(54) FILE SYSTEM WITH MULTI-CLASS IN SITU TIERED ARCHIVING

(71) Applicant: Quantum Corporation, San Jose, CA (US)

(72) Inventors: Roderick Wideman, Shakopee, MN (US); Don Doerner, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 804 days.

(21) Appl. No.: 14/795,463

(22) Filed: Jul. 9, 2015

(65) Prior Publication Data

US 2017/0011048 A1     Jan. 12, 2017

(51) Int. Cl.
  *G06F 17/30* (2006.01)
  *G06F 16/11* (2019.01)
  *G06F 16/16* (2019.01)

(52) U.S. Cl.
  CPC .......... *G06F 16/113* (2019.01); *G06F 16/162* (2019.01)

(58) Field of Classification Search
  CPC ...................................... G06F 17/30
  USPC ....................................... 707/668
  See application file for complete search history.

(56) References Cited

U.S. PATENT DOCUMENTS

| | | | |
|---|---|---|---|
| 7,161,506 B2 | 1/2007 | Fallon | |
| 7,378,992 B2 | 5/2008 | Fallon | |
| 7,415,530 B2 | 8/2008 | Fallon | |
| 8,417,905 B2 * | 4/2013 | Linde | G06F 11/1466 707/649 |
| 8,463,749 B2 * | 6/2013 | Zizys | G06F 11/1451 707/649 |
| 8,643,513 B2 | 2/2014 | Fallon | |
| 8,782,005 B2 * | 7/2014 | Barnes | G06F 11/1451 707/646 |
| 8,788,461 B2 * | 7/2014 | Stewart | G06F 11/1458 707/649 |
| 8,886,900 B2 * | 11/2014 | Craft | G06F 3/0607 711/161 |
| 8,903,772 B1 * | 12/2014 | Hayden | G06F 16/13 707/649 |
| 9,054,728 B2 | 6/2015 | Fallon | |
| 9,116,908 B2 | 8/2015 | Fallon | |
| 9,594,514 B1 * | 3/2017 | Bono | G06F 12/00 |

(Continued)

*Primary Examiner* — Kim T Nguyen
(74) *Attorney, Agent, or Firm* — Eschweiler & Potashnik, LLC

(57) ABSTRACT

Example apparatus and methods provide a file system that stores files in multiple different logical units. The logical units are associated with different classes of devices. The file system interacts with the logical units through block-based interfaces. The file system is a single file system that spans the multiple logical units. The multiple different logical units include data storage devices for which the file system manages block storage allocation and an object storage system that manages its own block storage allocation rather than having the file system manage its block storage allocation. The file system may maintain a single namespace, hierarchy, or directory structure for the multiple logical units. The object storage system may protect files using redundant copies, erasure codes, or other approaches. An archive process may selectively move files from other devices to the object storage system and leave a symbolic link behind.

12 Claims, 10 Drawing Sheets

(56) References Cited

U.S. PATENT DOCUMENTS 9,696,906 B1 * 7/2017 Bassov .................. G06F 3/0604
2016/0077756 A1 * 3/2016 Raj ....................... G06F 3/0608
　　　　　　　　　　　　　　　　　　　　　　711/162

* cited by examiner

FILE SYSTEM WITH MULTI-CLASS IN SITU TIERED ARCHIVING

BACKGROUND

A conventional file system uses a block storage paradigm. The "blocks" into which a conventional file system stores data may ultimately be physical locations on physical storage devices (e.g., hard disk drives). However, at least one level of indirection or abstraction typically exists between the physical storage devices and logical blocks processed by a conventional file system. For example, a conventional disk drive may be presented as a "logical unit" (LUN) and a conventional file system may organize collections of LUNs into block storage. These types of conventional systems may use homogenous groups of LUNs (e.g., homogenous groups of storage devices) to provide the blocks for the file system storage. These types of conventional systems typically do not use a heterogeneous mix of LUNs (e.g., heterogeneous mix of devices) to provide the blocks for the file system storage. A LUN is a reference to specific storage in a storage array network. A LUN can represent a drive (e.g., hard disk drive (HDD)), a portion of a drive, or a collection of drives.

While a file system may use a homogenous group of LUNs to provide the blocks for its block storage paradigm, input and output to and from the file system may not be homogenous. For example, some file system input/output (i/o) may involve large sequential transfers while other file system i/o may involve small random transfers. Some files or types of files may consistently produce a certain type of transfer. For example, movie files may consistently produce large sequential transfers while transaction processing database files may consistently produce small random transfers. Some directories in a file system may consistently produce a certain type of transfer. For example, a directory associated with a virtual tape may consistently experience large sequential transfers while a directory associated with a text-based social media application may consistently experience small random transfers. File systems or other applications may be able to track and understand relationships between files, file types, directories, and the types of transfers they experience.

The relationships between transfers and locations can be used to define affinities that facilitate steering data to selected LUNs available to a file system. For example, data that typically experiences a first type of transfer (e.g., large, sequential) may be steered toward a first group of LUNs while data that typically experiences a second type of transfer (e.g., small, random) may be steered toward a second group of LUNs. The first group of LUNs may have properties that make them more amenable to, efficient, practical, or affordable for one type of i/o while the second group of LUNs may have different properties that make them more appropriate for a second type of i/o. Using affinities to steer files to appropriate LUNs may improve the performance of the file system.

Even though conventional file systems may have steered data (e.g., files, directories) to LUNs with which the data had an affinity, opportunities for further improvements and efficiencies may have been missed. For example, even though LUNs have been defined and employed, the LUNs typically are all traditional disk-based LUNs. Even when an underlying device is not a simple single disk drive, the device(s) may be still be made to look like a consistent logical LUN. For example, a RAID set (e.g., RAID-1 RAID-6) may be presented to the file system as a logical block-based LUN.

Data stored by a file system may have a life cycle. When data is new and fresh it may be written or read more frequently. When data is old and stale, it may be written and read less frequently, Some data may only be written once and then rarely, if ever read. Some data may only be written once but may be regularly read. Thus, as data ages in a system, the i/o patterns associated with that data may change. Regardless of the i/o patterns associated with data, that data still consumes resources. For example, the data may use storage capacity in its original place, and may use additional storage capacity and consume processor cycles when backed up, Some data that is rarely if ever accessed may end up consuming space on primary storage devices used by a file system and on secondary storage used by backup devices.

Some conventional attempts to address the inefficiencies of having unused or rarely used data consuming space and processor cycles involve archiving certain data. Data may be archived based on factors including, for example, the size of the data, the age of the data, when the data was last accessed, or other criteria. Conventional archive processes may involve identifying data that ought to be archived and then moving that data to a separate, dedicated archival storage system. The separate, dedicated archival storage system typically is not managed by the original file system from which the data is archived, but rather is managed by its own separate file system. While having a separate file system provides some efficiencies, if the archived data is actually needed, having two separate file systems may introduce significant inefficiencies. Additionally, the separate file system associated with the dedicated archival storage system may also need to be backed up, consuming even more space and even more processor cycles.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Prior Art

DETAILED DESCRIPTION

Figure 1:
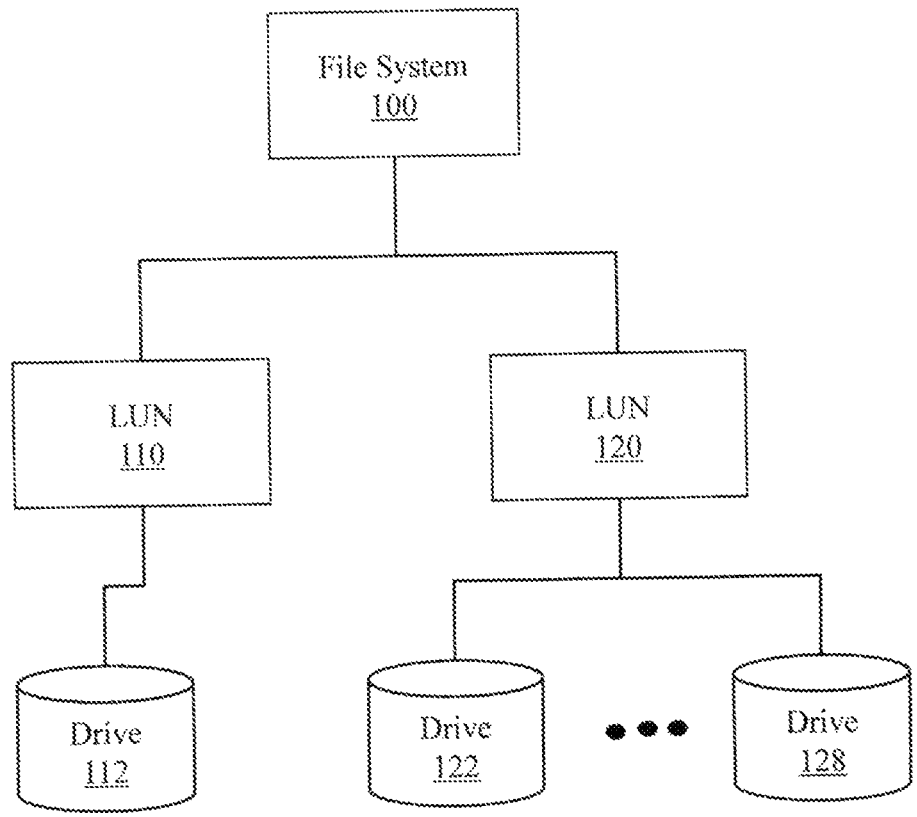
FIG. 1 illustrates a conventional file system.
Prior Art

Example apparatus and methods improve performance and efficiency for a file system. Example apparatus and methods provide a file system with different classes of storage, where members of the different classes are presented as block-based LUNs. The different classes of storage include an object storage system having a block-based LUN presentation. Other classes of storage may include a hard disk drive (HDD), a shingled magnetic recording (SMR) drive, a solid state drive (SSD), tape, flash memory, or other storage provided by other devices. In one embodiment, in situ tiered archiving is provided. In one embodiment, affinity based data storage is provided.

In one embodiment, a block-based LUN presentation of an object storage device is provided. An object storage device may perform its own storage allocation rather than have the file system perform block storage allocation. An object storage device may also provide different types of data protection. For example, an object storage device may produce and store redundant copies of data to protect the data. An object storage device may also produce and store erasure codes to protect data through erasure encoding.

In a conventional block-based storage device presented as a LUN, the file system manages block storage allocation. In an object storage device, the file system does not manage block storage allocation. Thus, conventional file systems may not have employed object storage devices due to this typical disconnect. Example apparatus and methods bridge this gap and allow a single file system to manage LUNs from different classes of storage including an object storage device that performs its own block storage allocation.

Since an object storage device is available as a block-based LUN, example apparatus and methods may also provide tiered archiving within a single file system. In one embodiment, the tiered archiving is provided, at least in part, by the object storage device. Providing tiered archiving within a single file system facilitates seamless scaling, uniform management, transparency to applications, and improved performance. Performance may be improved because data transfers associated with archiving data may all be performed within a single system, hierarchy, or namespace rather than requiring data to be moved through separate backup and archive servers having separate hierarchies or namespaces.

Since different classes of storage are available through a consistent block-based LUN interface, the value of affinities may be enhanced. For example, not only can certain data be steered to certain LUNs based on affinities, but different LUNs can be provided by different types of devices that may optimize data transfers. For example, large sequential data transfers may be steered toward LUNs associated with certain types of devices (e.g, tape drives) while small random data transfers may be steered toward LUNS associated with other types of devices (e.g., HDD). Some types of data transfers (e.g., page based) may be steered toward LUNs associated with yet other types of devices (e.g., SSD). Additionally, archival type transfers may simply be steered toward LUNs associated with an object storage device.

Prior art FIG. 1 illustrates a conventional file system 100 to which block-based LUNs 110 and 120 are presented. Block-based LUNs may be provided from a single device or from a collection (e.g., RAID) of devices. For example LUN 110 may be associated with a single drive 112 while LUN 120 may be associated with a collection of drives 122-128. Typically, drives 112 and 122-128 are similar (e.g., homogenous) drives.

Figure 2:
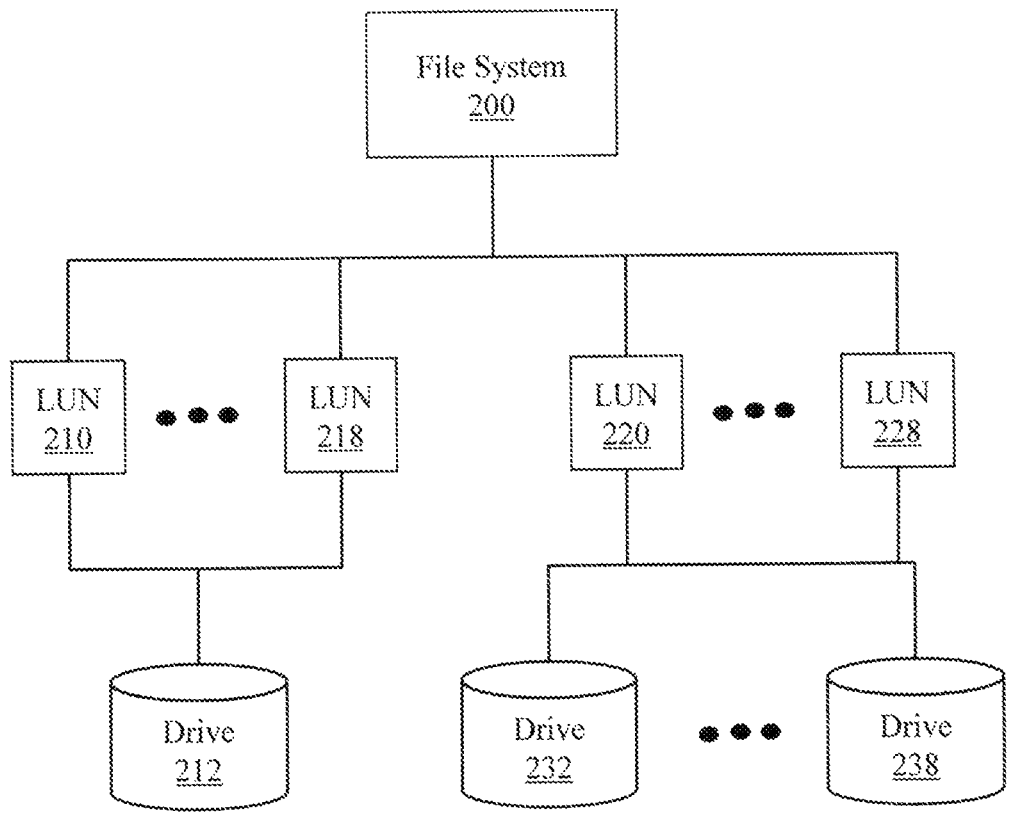
FIG. 2 illustrates a conventional file system.
Prior Art

Prior art FIG. 2 illustrates a conventional file system 200 to which block-based LUNs 210-218 and 220-228 are presented. LUNs 210-218 may be associated with a single drive 212 while LUNs 220-228 may be associated with drives 232-238. Drives 232-238 may be part of a redundant array of independent disks (RAID) set. Typically, drives 212 and 232-238 are similar (e.g., homogenous) drives.

Figure 3:
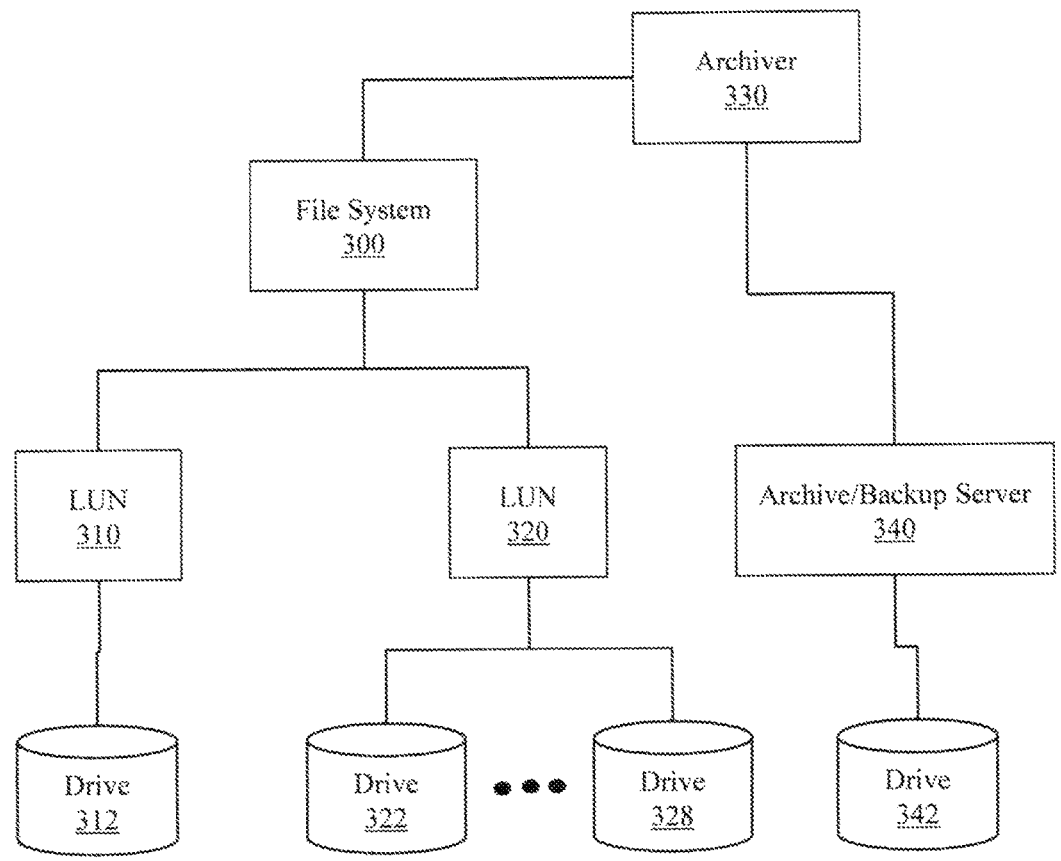
FIG. 3 illustrates a conventional file system.

Prior art FIG. 3 illustrates a file system 300 interacting with its own storage and also interacting with an archiver 330 that has its own storage. File system 300 may store data on drives 312 and 322-328 via LUNs 310 and 320. Archiver 330 may archive data on drive 342. Archiver 330 may use a separate backup and archive server 340 that interacts with its own storage (e.g., drive 342) using its own file system.

Figure 4:
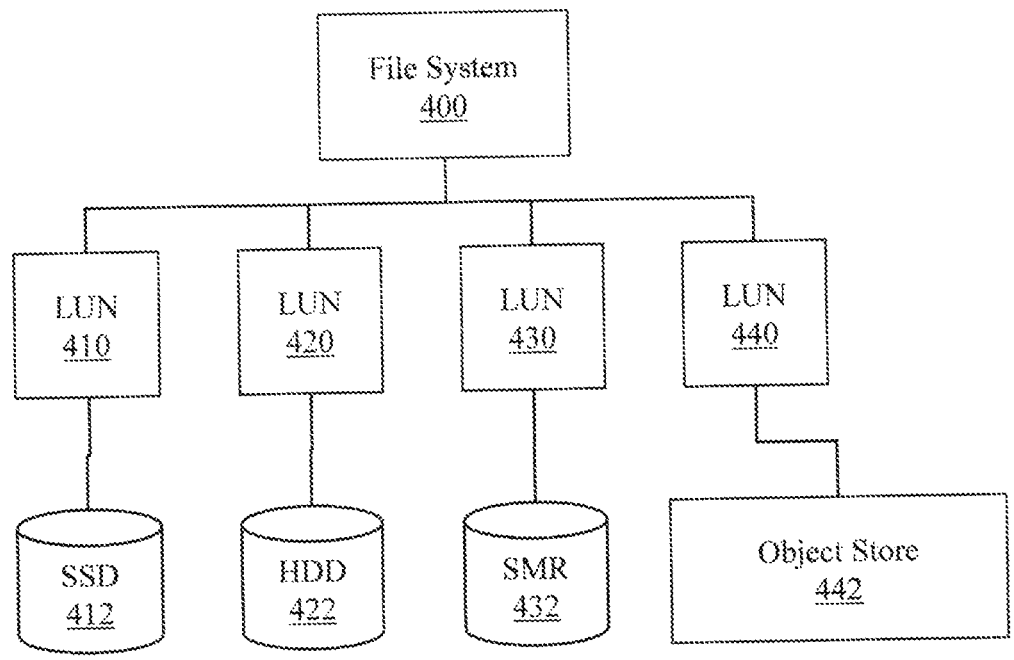
FIG. 4 illustrates an example file system.

FIG. 4 illustrates an example file system 400 interacting with a plurality of LUNs associated with different types of devices. For example, LUN 410 may provide an interface to an SSD 412, LUN 420 may provide an interface to HDD 422, LUN 430 may provide an interface to SMR 432, and LUN 440 may provide an interface to object store 442. The plurality of LUNs provide the file system with multi-class storage. While example LUNs are illustrated being provided for SSD, HDD, SMR, and an object storage device, different types of devices (e.g., tape) or combinations of devices may provide different combinations of LUNs in different examples. Unlike conventional systems, file system 400 has access to a mix of devices (e.g., HDD, SSD, SMR). Additionally, file system 400 can access files stored by object store 442 using a single hierarchy that spans all the LUNs.

Figure 5:
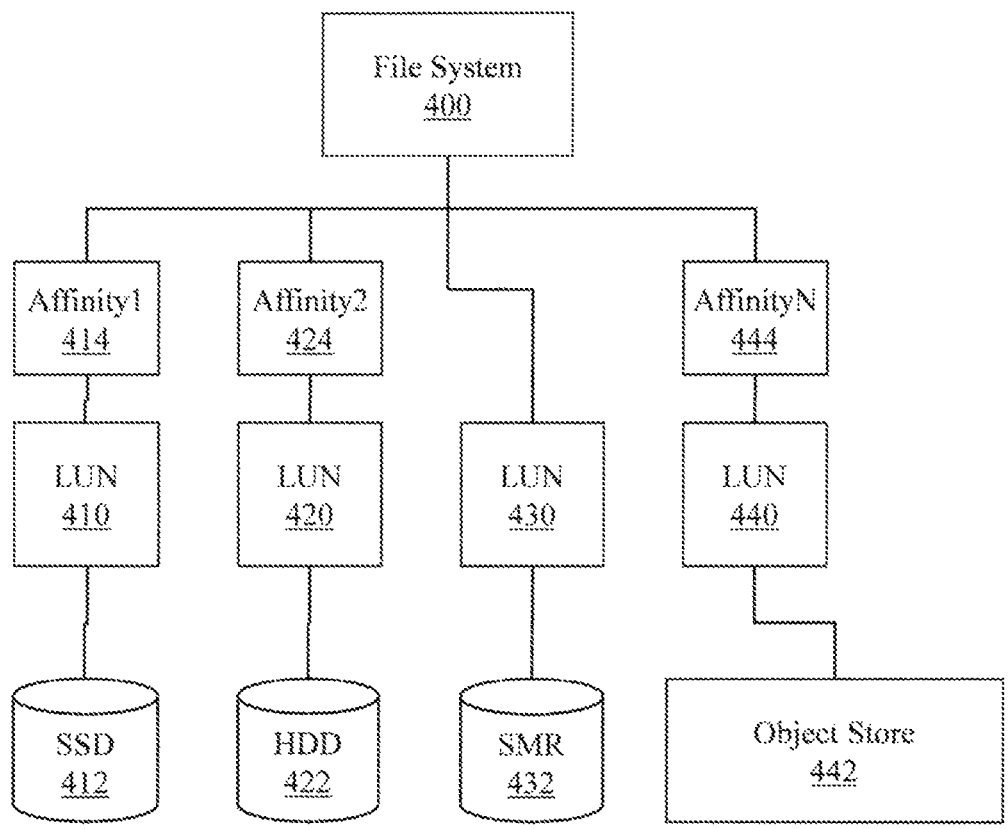
FIG. 5 illustrates an example file system.

FIG. 5 illustrates example file system 400 interacting with a plurality of LUNs 410-440 associated with different types of devices (e.g., SSD 412, HDD 422, SMR 432, object store 442). The LUNs 410-440 provide the file system 400 with multi-class storage. This example of file system 400 also has affinities 414. 424, and 444 available. Affinities may be associated with different classes of the LUNs. For example, a first affinity 414 could be associated with a first class of LUN (e.g., SSD 412), a second affinity 424 could be associated with a second class of LUN (e.g., HDD 422), and a third affinity 444 could be associated with a third class of LUN (e.g., object storage device 442). In one embodiment, multiple affinities may be assigned to a single class of LUNs. In one embodiment, not all classes of LUNs may have an associated affinity. For example, SMR 432 may not have an associated LUN. The number of LUNs for a LUN class may vary. The number of affinities may vary.

In one embodiment, a file system location (e.g., directory, sub-directory) may be created to facilitate in situ archiving. The file system location may be on a LUN having an affinity for an object storage device or system. In this embodiment, files placed at the file system location may then have file system blocks allocated from the object storage device or system. Unlike conventional systems, the object storage device or system will be accessible through the original file system rather than requiring access through a second, separate and distinct file system. This facilitates mitigating efficiency and addressing issues. Files stored in locations other than the file system location associated with in situ archiving will be stored on LUNs other than those associated with the in situ archiving. By way of illustration, files stored in the file system location associated with in situ archiving may be assigned to blocks from LUNs associated with the object storage device or system. Files stored at other file system locations not associated with in situ archiving may be assigned to blocks from LUNs associated with other storage devices or systems. In one embodiment, files stored at other file system locations not associated with in situ archiving may also be assigned to blocks from LUNs associated with the object storage device or system. These blocks may just be regular file system blocks rather than file system blocks associated with archiving.

Since a single file system is used to store data (e.g., files) on different classes of devices that present block-based LUNs, users or applications may have uniform visibility into the files available in the file system, regardless of where the files are actually stored (e.g., HOD, SMR, SDD, object store) and regardless of affinities. A user or application that has information about the affinities and their associated devices may explicitly choose to create or place files based on the affinities and their associated devices. For example, a user may drag and drop a first file onto a HOD but may drag and drop a second file or directory onto the object storage associated with the archive. While explicit choice of affinities and associated devices is provided, automated archiving may also be provided.

Figure 6:
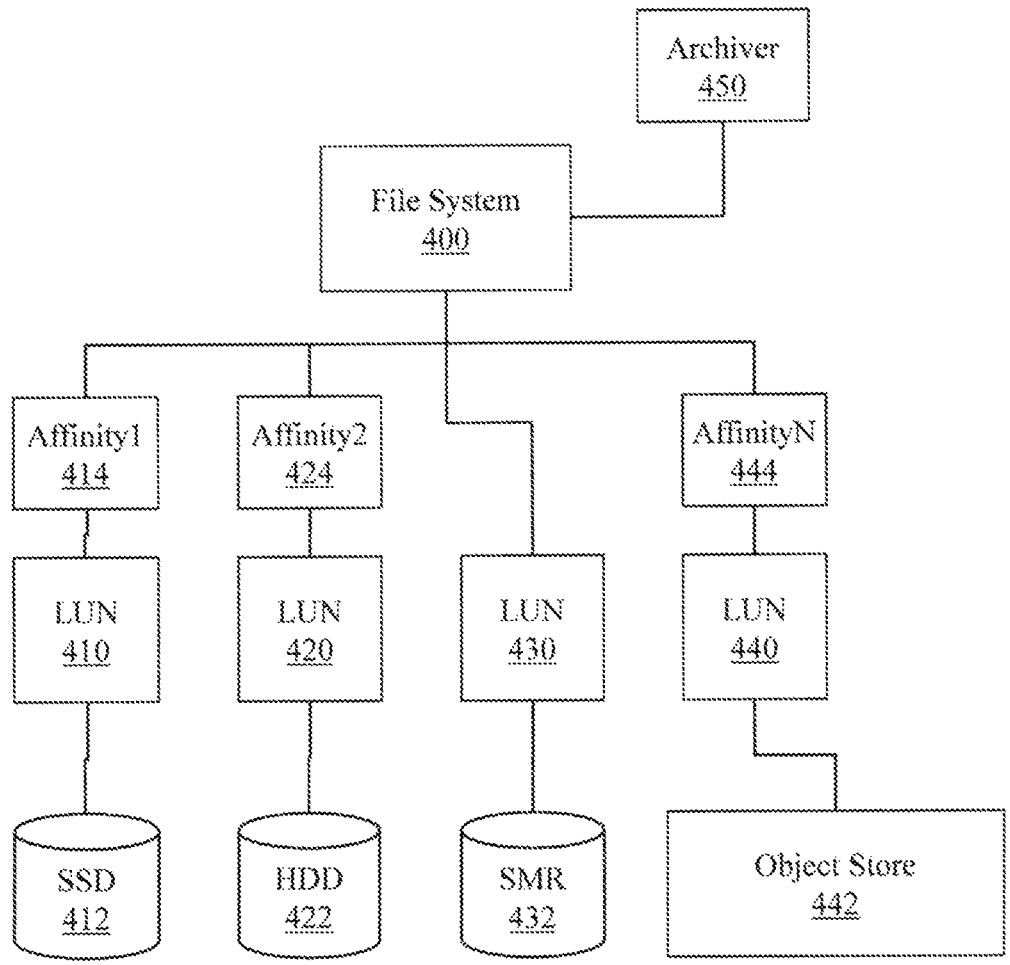
FIG. 6 illustrates an example file system.

FIG. 6 illustrates file system 400 interacting with an archiver 450. An archive functionality may be provided by a process or application (e.g., archiver 450) that is external to the file system 400 but that has visibility into the file system 400. The archiver 450 may cause files to be moved (e.g., copied, migrated) from one location in the file system 400 to another location in the file system 400. For example, the archiver 450 may identify data that is a candidate to be archived, retrieve the data from a first LUN associated with a first device and write the data to a second LUN associated with a second device. The archiver 450 may be configured with one or more policies for detecting files that are eligible for archiving and for controlling when the archiving may occur. By way of illustration, a file that has reached a certain age while stored on a HOD and whose access rate falls below a threshold may be moved to the object storage device 442 when file system activity is below a certain threshold.

While an external process is described, in one embodiment the archiver 450 may be provided by the file system 400. Having the archiver 450 be provided by the file system 400 itself may facilitate limiting resource consumption by the archiver 450 to the file system 400. Additionally, when the archiver 450 is part of the file system 400, the archiver 450 may operate more opportunistically when the file system activity falls above or below certain thresholds. For example, when the file system 400 is very busy, the archiver 450 may cause minimal migration but when the file system 400 is idle the archiver 450 may more aggressively migrate data.

Since a single file system is used to interact with all the LUNs, regardless of their underlying physical storage, symbolic links may be used for addressing. "Symbolic link" is used in its computer science and file system usage whereby a symbolic link is a file that links to another file or directory using its path. Unlike a hard link, a symbolic link can link to any file or directory on any computer. Using symbolic links may facilitate maintaining a uniform presentation of the file system. Using symbolic links, original file locations may be preserved, even after the physical data has been relocated from one location to another location. For example, a file that was located in a first directory but was archived may still appear to be in that logical directory even though the physical data has been migrated from a first device associated with a first LUN to a second device (e.g., archival object storage) associated with a second LUN. If and when the archived file is accessed later, the symbolic link will transparently direct access to the new archived location.

Example apparatus and methods provide an electronic data storage system that includes a file system that is configured to store files in two or more different logical units. The file system addresses files in a single hierarchy that spans the two or more logical units. The file system interacts with a logical unit through a block-based interface. The two or more different logical units include one or more data storage devices configured as logical units having block-based interfaces. The two or more different logical units also include an object storage system configured as a logical unit having a block-based interface. One difference between the data storage devices and the object storage system is that the file system manages block storage allocation for the one or more data storage devices but does not manage block storage allocation for the object storage system. Instead, the object storage system manages block storage allocation for itself.

The object storage system may protect files that are stored in the object storage. In one embodiment, the object storage system produces and stores one or more redundant copies of a file stored in the object storage system by the file system. In another embodiment, the object storage system produces and stores one or more erasure codes computed for a file stored in the object storage system by the file system. While redundancy and erasure coding are described, other protection approaches may be employed.

Unlike conventional systems, example apparatus and methods may interact with LUNs associated with different classes of devices. For example, the one or more data storage devices may include a hard disk drive, a solid state drive, a shingled magnetic recording drive, or a tape drive. In one embodiment, the one or more data storage devices include a combination of two or more different types of devices selected from the group including a hard disk drive, a solid state drive, a shingled magnetic recording drive, and a tape drive.

As described above, example apparatus and methods may use affinities. Thus, in one embodiment, the file system establishes and manages an affinity relationship between a file and a logical unit. The affinity relationship may be based, at least in part, on an attribute of the file. The file attribute may be, for example, a file name, a file location, a file size, a file type, an input/output pattern, an application that produced the file, a file protection, or a file access type. The file access type may be, for example, read access, write access, read/write access, or other access types. When affinity relationships are available, the file system may select a logical unit to store a file based, at least in part, on the affinity relationship.

Example apparatus and methods may provide an archiver that selects a file in the file system to be archived. The file may be selected based, at least in part, on a file criteria. The file criteria may be, for example, a file name, a file location, a file size, a file type, an application that produced the file, a file age, a file access time, or a file access history. After selection, the archiver may provide the file to the object storage system to be archived. The archiver may be policy based and thus may be programmable in other ways. For example, the archiver may determine when to provide a file to be archived to the object storage system based on a condition of the file system. The condition may be, for example, an activity level being experienced by the file system or a capacity available to the file system. For example, if the file system is near capacity, files may be provided to the archiver to make more space available. However, if the file system is very busy, files may not be provided to the archiver until the busy period ends so that available resources can be used to handle the file system load rather than the additional load of archiving.

In different embodiments the archiver may be part of the file system or may be external to the file system. Example apparatus and methods may also provide a user interface that facilitates identifying a logical unit or affinity to which a user wants a file to be stored.

When a file is relocated, the file system may establish a symbolic link for the relocated file. The symbolic link may be placed in a location in the file system from which the file to be archived was copied. The symbolic link may link to a location in the file system in the object storage system where the file was archived.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 7:
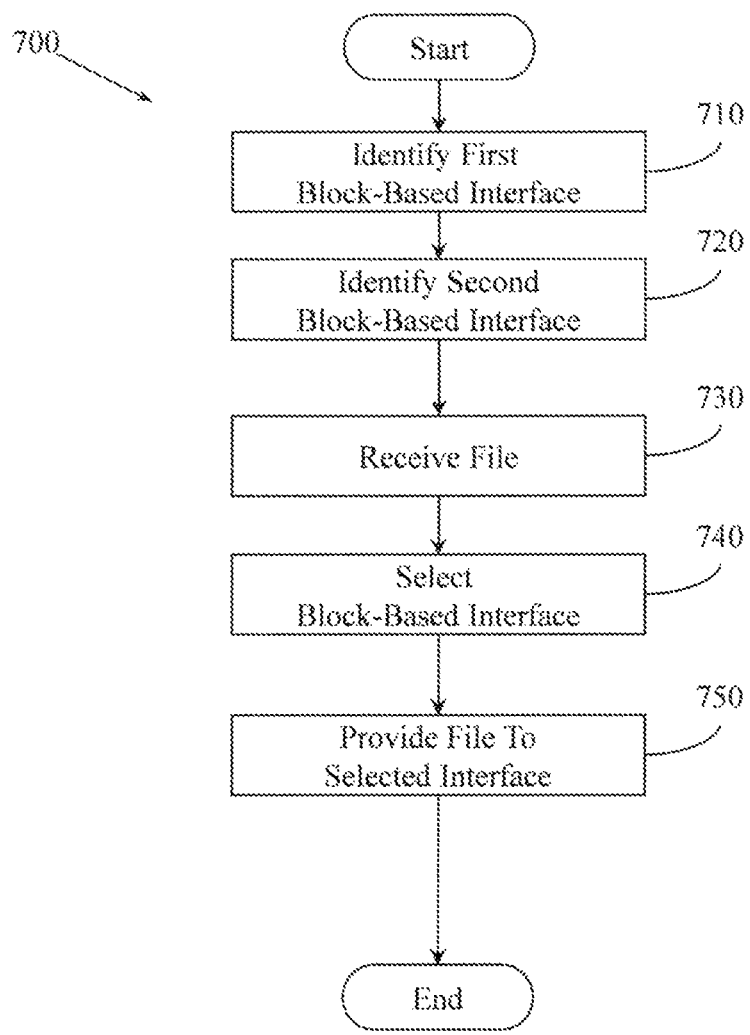
FIG. 7 illustrates an example method associated with a file system having multi-class storage and in situ tiered archiving.

FIG. 7 illustrates a method 700 associated with a file system having multi-class storage and in situ tiered archiving. Method 700 supports a file system having a hierarchy with storage locations in two or more different classes of storage devices. The different classes may include, for example, hard disk drives, solid state drives, shingled magnetic recording drives, tape drives, and other devices. Method 700 includes, at 710, identifying a first block-based interface for interfacing with a first logical unit. The first logical unit may be associated with a data storage device. The file system performs block storage allocation for the data storage device.

Method 700 also includes, at 720, identifying a second block-based interface for interfacing with a second logical unit. The second logical unit is associated with an object storage device. The file system does not perform block storage allocation for the object storage device, Instead, the object storage device performs its own block storage allocation.

Method 700 also includes, at 730, receiving a file to store in the file system. Receiving a file may include processing inputs from an operating system, processing inputs from an application, processing inputs from a graphical user interface or command line interface, receiving information or data in a procedure call, or other data communication operation.

Method 700 also includes, at 740, selecting a block-based interface to which the file to be stored is to be presented. The selection may be based, at least in part, on a match between a file attribute and a logical unit attribute. For example, the file attributes may indicate that the file is larger than a threshold size and is likely to experience large sequential transfers. These attributes may cause a first logical unit to be selected. Or, the file attributes may indicate that the file is smaller than a threshold size and is likely to experience short random transfers. These attributes may cause a different logical unit to be selected. Other attributes may cause other LUNs to be selected in other examples.

Method 700 also includes, at 750, providing the file to be stored to the selected block-based interface. Providing the file to the selected block-based interface will cause the file to be stored on the logical unit associated with the block-based interface. Providing the file to be stored to a block-based interface may include making a procedure call, writing a value to a register, writing an address to a register, copying data to a known location in memory, or other data communication action.

Figure 8:
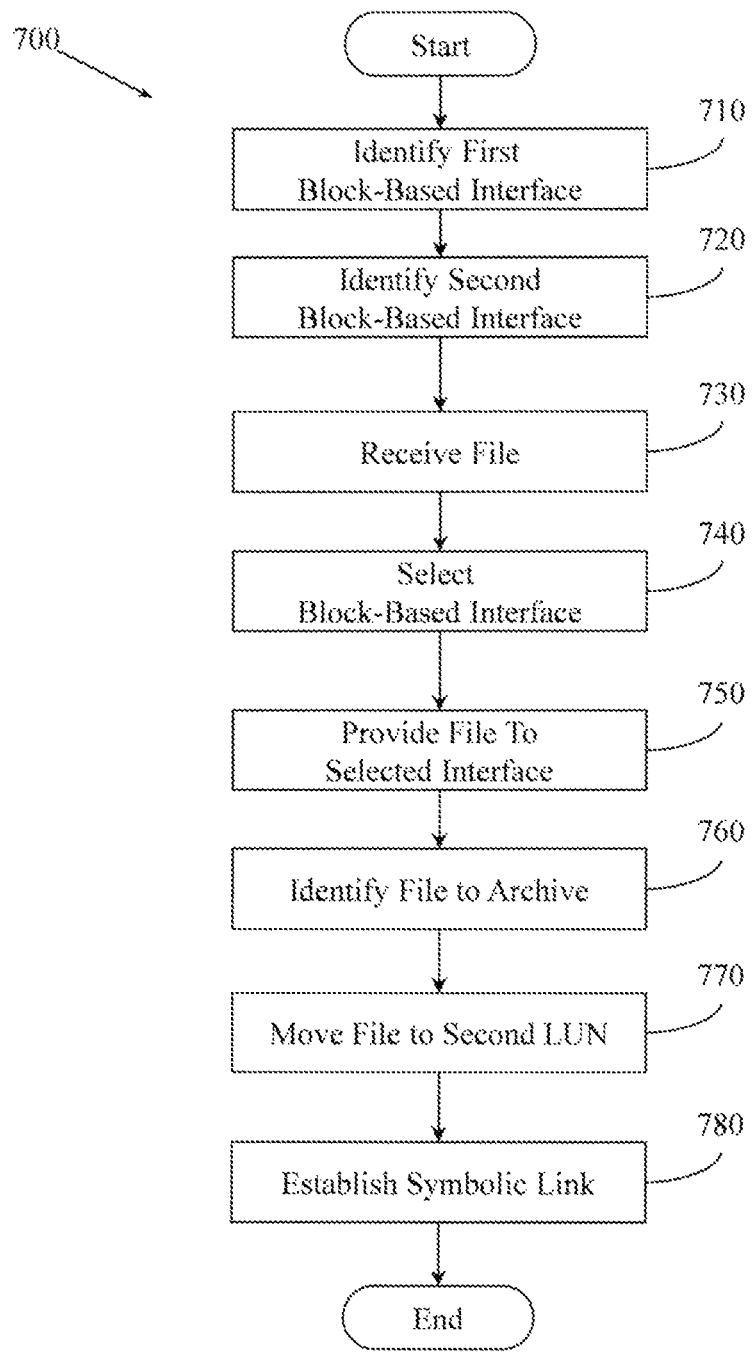
FIG. 8 illustrates an example method associated with a file system having multi-class storage and in situ tiered archiving.

FIG. 8 illustrates another embodiment of method 700. In this embodiment, method 700 includes, at 760, identifying a file to be archived that is stored on the first logical unit. The identifying may be based, for example, on an age of the file to be archived, on an access history of the file to be archived, or on other criteria or combinations of criteria. For example, a file that is older than a threshold age and that has been accessed less than a threshold number of times in a recent test period may be identified as a file to be archived.

Method 700 also includes, at 770, moving the file to be archived to the second logical unit. Once the file has been moved, method 700 may continue, at 780, by placing, in the first logical unit at the location from which the file to be archived was moved, information for locating the file to be archived in the second logical unit. The information may be, for example, a symbolic link.

In one example, a method may be implemented as computer executable instructions. Thus, in one example, a computer-readable medium may store computer executable instructions that if executed by a machine (e.g., processor) cause the machine to perform method 700. While executable instructions associated with method 700 are described as being stored on a computer-readable medium, it is to be appreciated that executable instructions associated with other example methods described herein may also be stored on a computer-readable medium.

Figure 9:
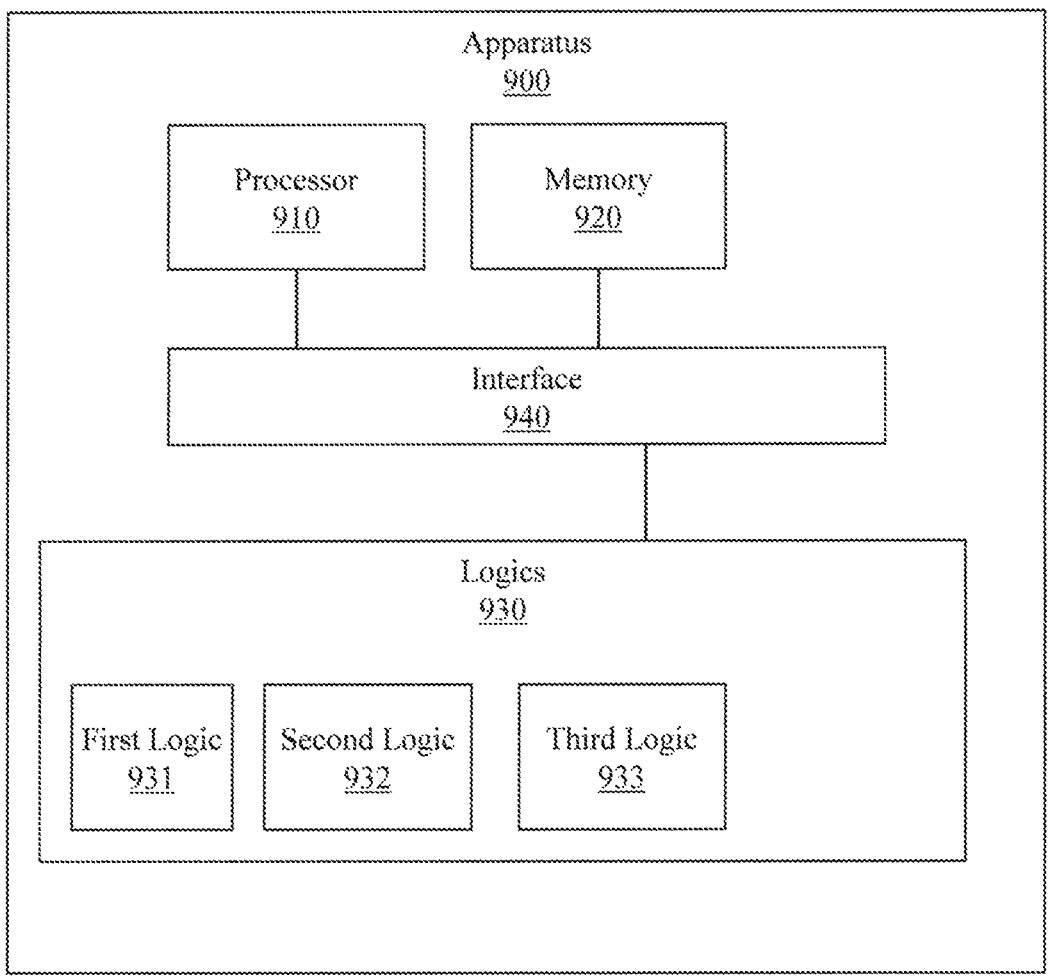
FIG. 9 illustrates an example apparatus associated with a file system having multi-class storage and in situ tiered archiving.

FIG. 9 illustrates an apparatus 900 that supports a file system having multi-class storage and in situ tiered archiving. Apparatus 900 includes a processor 910, a memory 920, and a set 930 of logics that is connected to the processor 910 and memory 920 by an interface 940. In one embodiment, processor 910 runs a file system process that supports a file system having a single hierarchy that spans a first logical unit and a second logical unit. Memory 920 may store metadata concerning the file system. Memory 920 may also store data about files, affinities, logical units, or other items associated with the file system.

In one embodiment, the functionality associated with the set of logics 930 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 930 are implemented as ASICs or SOCs. In one embodiment, the first logic 931, the second logic 932, or the third logic 933 may be ASICs, FPGA, or other integrated circuits.

The set 930 of logics includes a first logic 931 that handles input/output for the first logical unit through a first block-based interface. The first logical unit may be associated with a first device for which block storage allocation is handled by the file system. The first device may be, for example, a disk drive, a set of disk drives, or other data storage apparatus.

The apparatus 900 also includes a second logic 932 that handles input/output for a second logical unit through a second block-based interface. The second logical unit is associated with a second device that is configured as an object store. The file system does not handle block storage allocation for the object store. The object store may be a data storage apparatus (e.g., disk, tape, SSD) or collection of data storage apparatus.

The apparatus 900 also includes a third logic 933 that selectively relocates a file between the first logical unit and the second logical unit. Part of relocating the file between the two logical units involves storing a symbolic link at a location from which the file was copied. The symbolic link resolves to a location to which the file was copied.

Figure 10:
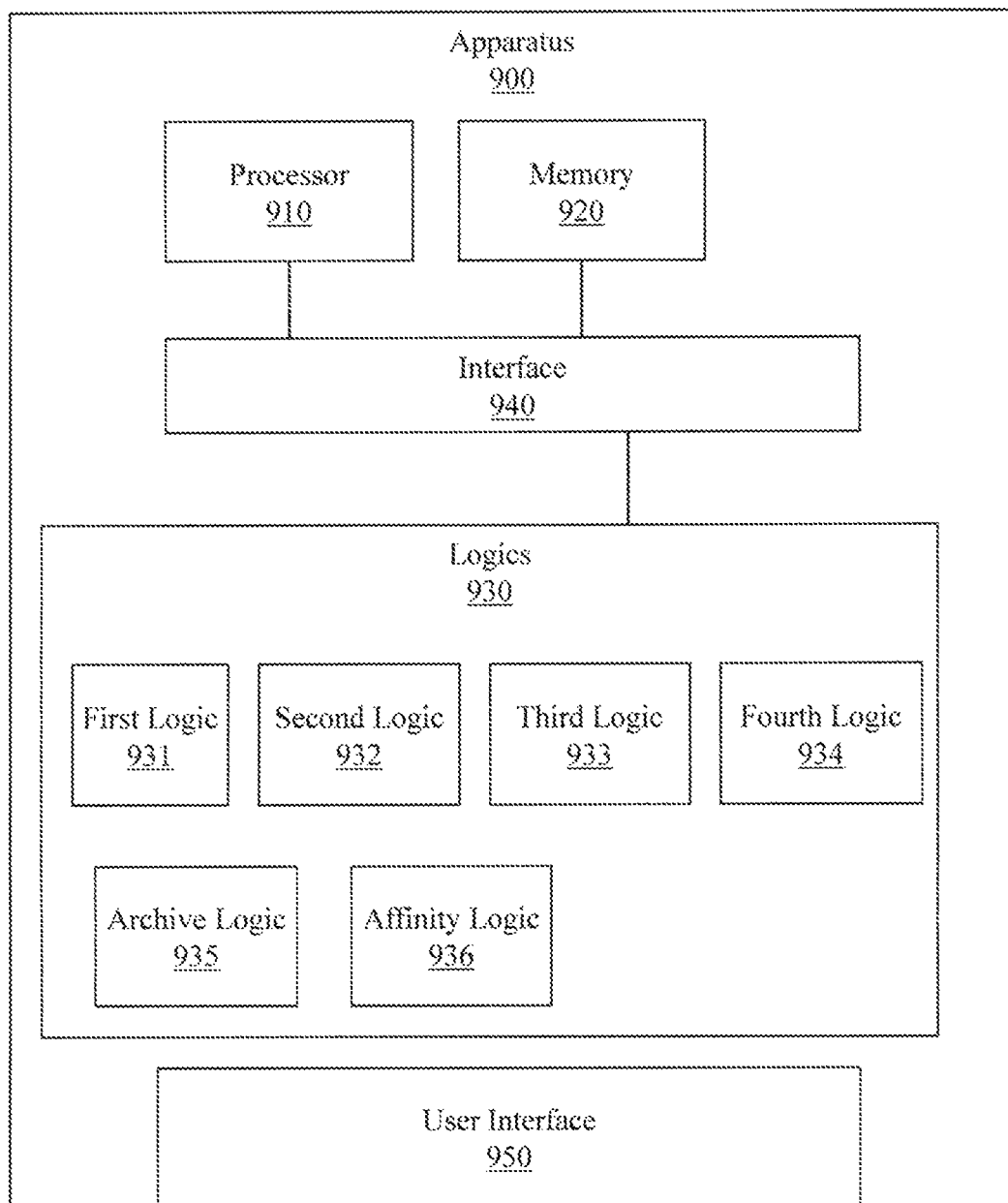
FIG. 10 illustrates an example apparatus associated with a file system having multi-class storage and in situ tiered archiving.

FIG. 10 illustrates another embodiment of apparatus 900. This embodiment also includes a fourth logic 934 that protects a file stored in the object store using a redundancy approach or an erasure coding approach. In one embodiment, the fourth logic 934 may select the protection approach based on an attribute of the file. For example, a first file size may indicate that the file is more easily and efficiently protected by making redundant copies while a second file size may indicate that the file is better protected using erasure coding approaches.

This embodiment of apparatus 900 also includes an archive logic 935 that selects a file on the first logical unit to be archived. After selecting the file, archive logic 935 causes the file to be archived by controlling the third logic 933 to relocate the file from the first logical unit to the second logical unit.

This embodiment of apparatus 900 also includes an affinity logic 936 that selectively routes a file to be stored to a selected logical unit. The file may be routed based, at least in part, on an affinity relationship between the file and the selected logical unit. In different embodiments, the affinity relationship may be a function of a size of the file to be stored, a type of the file to be stored, an input/output access pattern associated with the file to be stored, or other file attributes.

This embodiment of apparatus 900 also presents a user interface 950. User interface 950 displays a representation of a file, a representation of the first logical unit, and a representation of the second logical unit. The user interface 950 accepts a user input that identifies the logical unit on which the file is to be stored. The user interface 950 may be, for example, a graphical user interface, a command line interface, or other type of interface.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, except when used in the phrase "logical unit" refers to computer hardware or firmware in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User" as used herein, includes but is not limited to one or more persons, software, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic data storage system, comprising:
   a file system comprising one or more processors configured to store files in two or more different logical units, where the file system interacts with a logical unit through a block-based interface;
   where the two or more different logical units comprise:
   one or more data storage devices configured as logical units having block-based interfaces; and
   an object storage system configured as a logical unit having a block-based interface, where the object storage system produces and stores one or more redundant copies of a file stored in the object storage system by the file system;
   where the file system manages block storage allocation for the one or more data storage devices,
   where the file system does not manage block storage allocation for the object storage system,
   where the object storage system manages block storage allocation for the object storage system, and
   where the file system addresses files in a single hierarchy that spans the two or more different logical units.

2. The system of claim 1, where the object storage system produces and stores one or more erasure codes computed for a file stored in the object storage system by the file system.

3. The system of claim 1, where the one or more data storage devices include a device selected from the group including a hard disk drive, a solid state drive, a shingled magnetic recording drive, and a tape drive.

4. The system of claim 1, where the one or more data storage devices include a combination of two or more different types of devices selected from the group including a hard disk drive, a solid state drive, a shingled magnetic recording drive, and a tape drive.

5. The system of claim 1, where the file system establishes and manages an affinity relationship between a file and a logical unit based, at least in part, on an attribute of the file, the attribute of the file being a file name, a file location, a file size, a file type, an input/output pattern, an application that produced the file, a file protection, or a file access type.

6. The system of claim 5, where the file system selects a logical unit to store the file based, at least in part, on the affinity relationship.

7. The system of claim 1, comprising an archiver that selects a file in the file system to be archived based, at least in part, on a file criteria and provides the file to the object storage system to be archived.

8. The system of claim 7, where the file criteria is a file name, a file location, a file size, a file type, an application that produced the file, a file age, a file access time, or a file access history.

9. The system of claim 7, where the archiver determines when to provide the file to be archived to the object storage system based on a condition of the file system, the condition being an activity level being experienced by the file system or a capacity available to the file system.

10. The system of claim 7, where the archiver is part of the file system.

11. The system of claim 7, where the file system establishes a symbolic link in a location in the file system from which the file to be archived was copied to a location in the file system in the object storage system where the file was archived.

12. The system of claim 1, comprising a user interface configured to facilitate identifying a logical unit or affinity to which a user wants a file to be stored.

* * * * *